US012715988B2

(12) United States Patent
Nakahara et al.

(10) Patent No.: US 12,715,988 B2
(45) Date of Patent: Aug. 25, 2026

(54) POLYMER FINE PARTICLES HAVING STRUCTURAL COLOR DEVELOPMENT PROPERTY

(71) Applicant: MITSUBISHI CHEMICAL CORPORATION, Tokyo (JP)

(72) Inventors: Shota Nakahara, Tokyo (JP); Masaya Ota, Tokyo (JP); Kousuke Minetaki, Tokyo (JP); Kenta Yamamoto, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 859 days.

(21) Appl. No.: 17/929,853

(22) Filed: Sep. 6, 2022

(65) Prior Publication Data

US 2022/0411620 A1 Dec. 29, 2022

Related U.S. Application Data

(63) Continuation of application No. PCT/JP2021/012103, filed on Mar. 24, 2021.

(30) Foreign Application Priority Data

Mar. 25, 2020 (JP) ................................. 2020-054978

(51) Int. Cl.

*C08L 25/06* (2006.01)
*C08J 3/02* (2006.01)
*C08J 3/12* (2006.01)

(52) U.S. Cl.

CPC ................. *C08L 25/06* (2013.01); *C08J 3/02* (2013.01); *C08J 3/12* (2013.01); *C08J 2325/06* (2013.01)

(58) Field of Classification Search

CPC ....... C09D 5/29; C09D 125/089; C08L 25/06; C08J 2325/06; C08F 212/08; C08F 220/06

See application file for complete search history.

(56) References Cited

U.S. PATENT DOCUMENTS

| | | | | |
|---|---|---|---|---|
| 2010/0068433 | A1* | 3/2010 | Gibanel | C09D 5/02 427/386 |
| 2010/0285221 | A1 | 11/2010 | Oki et al. | |
| 2011/0177348 | A1* | 7/2011 | Yomo | B05D 7/574 427/372.2 |
| 2012/0194621 | A1* | 8/2012 | Ikegami | B41J 2/15 347/100 |
| 2014/0296437 | A1 | 10/2014 | Hatae et al. | |

FOREIGN PATENT DOCUMENTS

| | | | |
|---|---|---|---|
| CN | 101880494 | A1 | 11/2010 |
| CN | 104302715 | A | 1/2015 |
| JP | 2004-204033 | A | 7/2004 |
| JP | 2004-269922 | A | 9/2004 |
| JP | 2007-106883 | A | 4/2007 |
| JP | 2009-249527 | A | 10/2009 |
| JP | 2010-215770 | A | 9/2010 |
| JP | 2011-5481 | A | 1/2011 |
| JP | 2012-46617 | A | 3/2012 |
| JP | 2014-47232 | A | 3/2014 |
| JP | 2014-47233 | A | 3/2014 |
| JP | 2014-136732 | A | 7/2014 |
| JP | 2017-119798 | A | 7/2017 |
| JP | 2017-160371 | A | 9/2017 |
| JP | 2017-223915 | A | 12/2017 |
| JP | 2018-203843 | A | 12/2018 |
| JP | 2020-23631 | A | 2/2020 |
| JP | 2020-100736 | A | 7/2020 |
| WO | WO 2007/026408 | A1 | 3/2007 |
| WO | WO 2013/062123 | A | 5/2013 |

OTHER PUBLICATIONS

Extended European Search Report issued on Jul. 24, 2023 in European Patent Application No. 21777182.3, 5 pages.

Written Opinion of the International Searching Authority issued on May 18, 2021 in PCT/JP2021/012103 filed on Mar. 24, 2021 (submitting English translation only), 4 pages.

Chinese Office Action issued Aug. 10, 2024, in Chinese Patent Application No. 202180021135.4 (with uneditited computer-generated English translation), received on Sep. 9, 2024, 17 pages.

International Search Report issued May 18, 2021 in PCT/JP2021/012103, filed on Mar. 24, 2021, 2 pages.

Li et al., "Preparation of a Three-Dimensional Ordered Macroporous Titanium Dioxide Material with Polystyrene Colloid Crystal as a Template", Journal of Applied Polymer Science vol. 107, Mar. 15, 2008, 6 Pages.

Japanese Office Action issued Jan. 7, 2025 in Japanese Patent Application No. 2022-510575 (with unedited computer generated English translation), 6 pages.

Japanese Notice of Reasons for Refusal issued Jul. 15, 2026 in Japanese Patent Application No. 2022-510575, 6 pgs.

* cited by examiner

*Primary Examiner* — Mark S Kaucher

(74) *Attorney, Agent, or Firm* — Oblon, McClelland, Maier & Neustadt, L.L.P.

(57) ABSTRACT

Polymer fine particles having a number average particle diameter of 50 to 450 nm and a CV value of particle diameter on a number basis of 5% or less, or polymer fine particles having a structural color development property when arranged. An acid value of the polymer fine particles is 5 to 38 mg KOH/g. An emulsion in which the polymer fine particles are dispersed in a medium mainly containing water. In addition, a structure in which the polymer fine particles are arranged and develop color.

15 Claims, No Drawings

POLYMER FINE PARTICLES HAVING STRUCTURAL COLOR DEVELOPMENT PROPERTY

CROSS-REFERENCE

This application is a Continuation of International Application No. PCT/JP2021/012103 filed on Mar. 24, 2021, which claims priority to Japanese Patent Application No. 2020-054978 filed on Mar. 25, 2020. The entire contents of which are incorporated herein by reference.

TECHNICAL FIELD

The present disclosure relates to polymer fine particles having a structural color development property, an emulsion and a structure including the polymer fine particles, and an article in which the structure is formed.

BACKGROUND ART

In recent years, toxicity of azo pigments containing heavy metals has been concerned. In addition, there is a problem that dyes have poor light resistance. Therefore, in order to provide a color material having low toxicity and good light resistance, it has been studied to dispose an object exhibiting a structural color on a surface layer of a molded article. By disposing an object exhibiting a structural color on a surface layer of a molded article, a remarkable effect such as providing a color material having good light resistance without using heavy metals is expected.

Various materials have been studied as materials for an object exhibiting a structural color, and polymer fine particles are often used as materials because of easy production. Among them, it is desired to use a polystyrene-based polymer as a material.

As a method for producing a polystyrene-based polymer used as a material for an object exhibiting a structural color, a method for producing the polystyrene-based polymer by soap-free emulsion polymerization has been proposed (see Non-Patent Document 1).

In addition, as a method for obtaining a structural color coating film-forming coating material composition, a method for producing core-shell type polymer fine particles by soap-free emulsion polymerization has been proposed (see Patent Document 1).

In addition, a method for obtaining acrylic polymer fine particles as a polymer powder by soap-free emulsion polymerization has been proposed (see Patent Document 2).

PRIOR ART LITERATURE

Non-Patent Documents

Non Patent Document 1: Journal of Applied Polymer Science, Vol. 107, p. 3903-3908 (2008)

PATENT DOCUMENTS

Patent Document 1: JP 2009-249527 A
Patent Document 2: WO 2013/062123 A

SUMMARY OF THE INVENTION

The production method proposed in Non-Patent Document 1 involves a problem of generation of large amounts of cullet at the time of polymerization and deposits onto an inner wall and the like of a polymerization apparatus, resulting in a low yield of the polystyrene-based polymer. In addition, there is a problem of poor productivity because of a low solid content concentration (10 mass %) at the time of polymerization.

The method proposed in Patent Document 1 involves a problem of poor productivity because of a low solid content concentration (20 mass %) at the time of polymerization. In addition, monomers used at the time of polymerization of a core layer are styrene, methyl methacrylate, and divinylbenzene, and the core layer is a polymer having no acid value. Therefore, there is a problem of generation of large amounts of cullet at the time of polymerization and deposits onto an inner wall and the like of a polymerization apparatus, resulting in a low yield of the polymer.

In the method proposed in Patent Document 2, the obtained acrylic polymer fine particles have a volume average primary particle diameter of 600 nm or more, and a structure obtained when the polymer fine particles are arranged has no structural color development property in a visible light region. In addition, Patent Document 2 aims to spray-dry the polymer fine particles obtained in the form of an emulsion to form a powder, and does not give suggestion regarding the structural color development property.

An object of the present disclosure is to solve the above problems. That is, an object of the present disclosure is to provide polymer fine particles which are used as a material for an object exhibiting a structural color and generate small amounts of cullet at the time of polymerization and deposits onto an inner wall and the like of a polymerization apparatus, even at a high solid content concentration.

Means for Solving the Problems

As a result of intensive studies to solve the above problems, the present inventors have found that, when the polymer fine particles have an acid value in a specific range, generation of cullet at the time of polymerization and deposits onto an inner wall and the like of a polymerization apparatus is reduced even at a high solid content concentration, leading to the present disclosure.

That is, the gist of the present disclosure is as follows.

[1] Polymer fine particles having a number average particle diameter of 50 to 450 nm and a CV value of particle diameter on a number basis of 5% or less, wherein the polymer fine particles have an acid value of 5 to 38 mg KOH/g.

[2] The polymer fine particles according to [1], wherein the polymer fine particles preferably have a uniform resin composition.

[3] The polymer fine particles according to [1] or [2], wherein a Tg of the polymer fine particles is preferably 50° C. or higher.

[4] The polymer fine particles according to any one of [1] to [3], wherein the polymer fine particles are preferably composed of a polystyrene-based polymer.

[5] The polymer fine particles according to [4], wherein the polystyrene-based polymer preferably contains an acrylic acid unit and/or a methacrylic acid unit.

[6] An emulsion in which the polymer fine particles according to any one of [1] to [5] are dispersed in a medium mainly containing water.

[7] A structure in which the polymer fine particles according to any one of [1] to [5] are arranged and develop color.

[8] An article in which the structure according to [7] is formed on a substrate.

[9] The article according to [8], which preferably has a film-like shape.

[10] Polymer fine particles having a structural color development property when arranged, wherein the polymer fine particles have an acid value of 5 to 38 mg KOH/g.

[11] The polymer fine particles according to [10], wherein the polymer fine particles preferably have a uniform resin composition.

[12] The polymer fine particles according to [10] or [11], wherein a Tg of the polymer fine particles is preferably 50° C. or higher.

[13] The polymer fine particles according to any one of [10] to [12], wherein the polymer fine particles are preferably composed of a polystyrene-based polymer.

[14] The polymer fine particles according to [13], wherein the polystyrene-based polymer preferably contains an acrylic acid unit and/or a methacrylic acid unit.

[15] An emulsion in which the polymer fine particles according to any one of [10] to [14] are dispersed in a medium mainly containing water.

[16} A structure in which the polymer fine particles according to any one of [10] to [14] are arranged and develop color.

[17] An article in which the structure according to [16] is formed on a substrate.

[18] The article according to [17], which preferably has a film-like shape.

Effects of the Invention

The polymer fine particles of the present disclosure generate small amounts of cullet at the time of polymerization and deposits onto an inner wall and the like of a polymerization apparatus even at a high solid content concentration, and thus can be produced in a high yield. In addition, the polymer fine particles have an excellent structural color development property, and thus are suitable as a material for an object exhibiting a structural color.

The object exhibiting a structural color according to the present disclosure shows excellent structural color development, and thus is suitable for improving design of the article.

MODES FOR CARRYING OUT THE INVENTION

Hereinafter, an embodiment of the present invention will be described in detail. However, the description of constituent elements which will be described below is an example (representative example) of an embodiment of the present invention, and the present invention is not limited to the following contents as long as it does not exceed the gist of the present invention.

As used herein, the expression “to” means inclusion of numerical values or physical values indicated before and after the expression. In addition, the numerical values or physical values described as an upper limit and a lower limit are used in a meaning including the values.

The polymer fine particles have a number average particle diameter of 50 to 450 nm, a CV value of particle diameter on a number basis of 5% or less, and an acid value of 5 to 38 mg KOH/g.

[Number Average Particle Diameter]

The polymer fine particles have a number average particle diameter of 50 to 450 nm.

When the number average particle diameter falls within the above range, a good structural color development property is obtained.

A method for measuring the number average particle diameter is as described in Examples.

The number average particle diameter of the polymer fine particles can be set within the above range, for example, by adjusting types and blending proportions of monomer components other than styrene and an acidic monomer at the time of production.

[CV Value of Particle Diameter on Number Basis]

The polymer fine particles have a CV value of particle diameter on a number basis of 5% or less.

The CV value is also referred to as “coefficient of variation” or “relative standard deviation”, and is calculated as (standard deviation/average particle diameter)×100 in the present disclosure.

When the CV value of particle diameter on a number basis of the polymer fine particles falls within the above range, a good structural color development property is obtained.

A method for measuring the CV value of particle diameter on a number basis of the polymer fine particles is as described in the Examples.

The CV value of particle diameter on a number basis of the polymer fine particles can be adjusted at the time of production, for example, by selecting a polymerization method as will be described later or performing an operation such as sieving on a pulverized object after polymerization, and can be set to 5% or less.

[Acid Value]

An acid value of the polymer fine particles is 5 to 38 mg KOH/g.

When the acid value is 5 mg KOH/g or more, cullet at the time of polymerization is reduced. When the acid value is 38 mg KOH/g or less, stability at the time of polymerization is improved.

The acid value of the polymer fine particles can be set within the above range, for example, by adjusting a blending proportion of an acidic monomer constituting the polymer fine particles at the time of production of the polymer fine particles.

[Particles Having Uniform Resin Composition]

The polymer fine particles are preferably particles having a uniform resin composition.

The particles having a uniform resin composition mean that, when the polymer fine particles are copolymers, the resin composition is substantially the same with respect to the entire polymer fine particles. That is, it means that the resin composition is substantially uniform throughout the entire particles, and also means that the resin composition is not biased except for composition bias which is unavoidable in production, for example.

The particles having a uniform resin composition are produced, for example, by keeping the same composition of monomers to be supplied in a period ranging from an initial stage to a final stage of polymerization without changing the composition.

Particles having a uniform resin composition are preferable because a difference between refractive indexes inside and outside the particles increases and the structural color development property is improved.

[Tg of 50° C. or Higher]

The polymer fine particles preferably have a Tg of 50° C. or higher. In order to set the Tg of the polymer fine particles to 50° C. or higher, a polymer having a Tg of 50° C. or higher only need be used and formed into fine particles.

Examples of the polymer having a Tg of 50° C. or higher include polyamides, polyimides, low density polyethylene, high density polyethylene, poly(meth)acrylic acid esters, polystyrene-based polymers such as polystyrene and derivatives thereof, polyvinyl chloride, phenol resins, and polycarbonates.

Among them, poly(meth)acrylic acid esters and polystyrene-based polymers are preferable because raw materials therefor are easily obtained and fine particles having a uniform particle diameter are easily produced, and polystyrene-based polymers are more preferable because a polymer having a high refractive index can be obtained.

The polymer having a high refractive index is preferable because the difference between refractive indexes inside and outside the particles increases and the structural color development property is improved.

In the present specification, (meth)acrylic acid means acrylic acid and/or methacrylic acid.

The Tg of the polymer fine particles is more preferably 60° C. or higher, still more preferably 70° C. or higher.

When the Tg of the polymer fine particles is 50° C. or higher, the structure is maintained even under a high-temperature use environment. Thus, the Tg is preferably 50° C. or higher.

The polymer fine particles preferably have a Tg of 50° C. or higher as described above, and, in this case, the polymer fine particles may be composed of a non-crosslinked polymer or a crosslinked polymer.

Tg is a value calculated from the Fox's equation.

[Poly(Meth)Acrylic Acid Esters]

The poly(meth)acrylic acid esters each are a polymer containing a (meth)acrylic acid ester unit as a main component. Here, the main component means that a content rate of the (meth)acrylic acid ester unit is 50 mass % or more, and further 60 mass % or more with respect to the entire polymer.

Examples of the (meth)acrylic acid ester as a raw material for the (meth)acrylic acid ester unit include methyl (meth) acrylate, ethyl (meth)acrylate, propyl (meth)acrylate, and butyl (meth)acrylate.

Among them, methyl (meth)acrylate is preferable, and methyl methacrylate is more preferable because the Tg of the resulting polymer is 50° C. or higher.

The poly (meth)acrylic acid esters each may be a random copolymer or a block copolymer, but is generally a random copolymer.

The poly (meth)acrylic acid esters each may be obtained by copolymerization of arbitrary monomers in addition to the (meth)acrylic acid esters described above.

[Polystyrene-Based Polymer]

The polystyrene-based polymer is a polymer containing a styrene unit as a main component. Here, the main component means that a content rate of the styrene unit is 50 mass % or more, and further 60 mass % or more with respect to the entire polymer.

The polystyrene-based polymer may be a random copolymer or a block copolymer, but is generally a random copolymer.

The polystyrene-based polymer has a shape of fine particles having a uniform particle diameter (specifically, fine particles having a number average particle diameter of 50 to 450 nm and a CV value of 5% or less) in order to achieve the effects of the present disclosure.

In order to obtain fine particles having a uniform particle diameter, for example, there is a method of obtaining a polymer having an appropriate size by bulk polymerization, suspension polymerization, emulsion polymerization, solution polymerization, or the like, pulverizing the polymer to obtain a fine powder, and making the particle diameter uniform by an operation such as sieving. In addition, there is a method of directly obtaining fine particles having a uniform particle diameter by soap-free emulsion polymerization.

Among them, the method by soap-free emulsion polymerization is preferable because of excellent productivity.

[Monomer Unit of Polystyrene-Based Polymer]

The polystyrene-based polymer preferably contains a styrene unit and an acidic monomer unit. In other words, the polystyrene-based polymer is a copolymer of styrene and an acidic monomer, and is preferably composed of a constituent unit derived from styrene and a constituent unit derived from an acidic monomer.

The styrene as a raw material for the styrene unit is not particularly limited, and a general-purpose styrene may be used.

Examples of the acidic monomer as a raw material for the acidic monomer unit include monomers having a carboxyl group such as acrylic acid, methacrylic acid, maleic acid, fumaric acid, or cinnamic acid; monomers having a sulfonic acid group such as sulfonated styrene; and monomers having a sulfonamide group such as vinylbenzenesulfonamide.

Among them, acrylic acid and methacrylic acid are preferable, and acrylic acid is more preferable, because they are water-soluble and have a great effect of reducing cullet at the time of polymerization.

One acidic monomer may be used alone, or two or more acidic monomers may be used in combination.

That is, the styrene-based polymer preferably contains an acrylic acid unit and/or a methacrylic acid unit, and more preferably contains an acrylic acid unit, in addition to the styrene unit as the main component. In this case, the Tg of the polymer fine particles can be easily adjusted.

When a crosslinked structure is introduced into the polystyrene-based polymer, a known polyfunctional monomer only need be copolymerized.

Examples of the polyfunctional monomer include divinylbenzene, hexanediol di(meth)acrylate, ethylene glycol di(meth)acrylate, diethylene glycol di(meth)acrylate, tri ethylene glycol di(meth)acrylate, tetraethylene glycol di(meth) acrylate, hexaethylene glycol di(meth)acrylate, nonaethylene glycol di(meth)acrylate, neopentyl glycol di(meth) acrylate, and diallyl phthalate.

Among them, divinylbenzene and hexanediol diacrylate are preferable.

One polyfunctional monomer may be used alone, or two or more polyfunctional monomers may be used in combination.

In the present specification, (meth)acrylate means acrylate and/or methacrylate.

The polystyrene-based polymer may further contain other monomer units. The other monomer units mean monomer units other than the styrene unit, the acrylic acid unit, and the methacrylic acid unit.

Examples of other monomers as raw materials for the other monomer units include styrenes other than styrene such as methyl styrene, chlorostyrene, dichlorostyrene, p-t-butylstyrene, p-n-butylstyrene, and p-n-nonylstyrene; metal salts such as sodium salt of styrenesulfonic acid; (meth) acrylic acid esters such as methyl (meth)acrylate, ethyl (meth)acrylate, propyl (meth)acrylate, n-butyl (meth)acrylate, isobutyl (meth)acrylate, hydroxyethyl (meth)acrylate, and ethylhexyl (meth)acrylate; and acrylamides such as acrylamide, N-propylacrylamide, N,N-dimethylacrylamide, N,N-dipropylacrylamide, and N,N-dibutylacrylamide.

Among them, a metal salt such as a sodium salt of styrenesulfonic acid is preferable because the particle diameter is well controlled.

[Composition of Polystyrene-Based Polymer]

The polystyrene-based polymer preferably contains 80.0 to 99.75 mass % of the styrene unit. When the content rate of the styrene unit is within the above range, the refractive index of the particle is increased, and the structural color development property is improved, which is preferable.

The content rate of the styrene unit is more preferably 90.0 mass % or more. It is more preferably 99.4 mass % or less.

The polystyrene-based polymer preferably contains 0.25 to 20.0 mass % of the acidic monomer unit. When a content rate of the acidic monomer unit is within the above range, cullet at the time of polymerization is reduced, which is preferable.

The content rate of the acidic monomer unit is more preferably 0.6 mass % or more. It is more preferably 10.0 mass % or less.

When the polystyrene-based polymer contains a polyfunctional monomer unit and/or any other monomer unit, a content rate thereof is preferably 3 mass % or less. When the content rate of the polyfunctional monomer unit and/or the other monomer unit is 3 mass % or less, the particle diameter is well controlled, which is preferable.

The content rate of the polyfunctional monomer unit and/or the other monomer unit is more preferably 2 mass % or less.

[Method for Producing Polymer Fine Particles]

The polymer fine particles are preferably obtained by soap-free emulsion polymerization. The soap-free emulsion polymerization is a known polymerization method, and is, for example, as follows.

Ion-exchanged water is charged in a reaction vessel, and a polymerization aid is added thereto while heating and stirring the ion-exchanged water as necessary to sufficiently disperse the polymerization aid in the ion-exchanged water. Next, a polymerization initiator is added while stirring is continued. Thereafter, the monomers are sequentially added dropwise while stirring is continued to start a polymerization reaction. Particles are formed as the polymerization proceeds.

The composition of the monomers sequentially added dropwise is preferably the same in a period ranging from an initial stage to a final stage of the dropwise addition.

A solid content concentration at the time of polymerization, that is, a concentration of the polymer fine particles with respect to the entire system at the time of polymerization is preferably 20 to 40 mass %.

When a solid content concentration at the time of polymerization is the lower limit or more, the productivity of the polymer fine particles is improved. When it is the upper limit or less, neither cullet at the time of polymerization nor deposits onto an inner wall and the like of a polymerization apparatus are generated.

When the polymerization initiator is used, a polymerization temperature is generally set to 60 to 90° C. After completion of the reaction, the polymer fine particles are taken out as an emulsion. The high solid content concentration in the present specification means that the concentration of solid contents (specifically, polymer fine particles) at the time of polymerization is, for example, 20 mass % or more.

Examples of the polymerization initiator used in the soap-free emulsion polymerization include water-soluble polymerization initiators such as sodium persulfate, potassium persulfate, and ammonium persulfate; oil-soluble polymerization initiator such as benzoyl peroxide and lauryl peroxide; redox-based polymerization initiators obtained by combining an oxidizing agent and a reducing agent.

These polymerization initiators may be used alone, or two or more thereof may be used in combination.

Among them, a water-soluble polymerization initiator is preferable from the viewpoint of easy handling.

In the present disclosure, for example, the acidic monomer such as acrylic acid or methacrylic acid is used as the monomer to be supplied into the polymerization system, in addition to the monomer as the main component, from the initial stage of polymerization, thereby making it possible to further reduce generation of cullet at the time of polymerization and deposits onto an inner wall and the like of a polymerization apparatus.

As a result, the yield at the time of polymerization can be further improved, and the productivity of the polymer fine particles can be further improved.

In addition, in the prior art, polymerization has been performed while the solid content concentration is lowered, in order to avoid generation of cullet at the time of polymerization and deposits onto an inner wall and the like of a polymerization apparatus. However, in the present disclosure, generation of cullet and deposits can be reduced, and thus the solid content concentration at the time of polymerization can be increased. Thus, the productivity of the polymer fine particles can be further improved.

[Emulsion]

The polymer fine particles are obtained by soap-free emulsion polymerization, and thus are obtained in the form of an emulsion. Here, the emulsion means that the polymer fine particles are dispersed in a medium mainly containing water.

The medium mainly containing water means that a ratio of water is 50 mass % or more, and further 60 mass % or more.

As a component other than water, any organic solvent soluble in water can be selected.

The emulsion may be in a state of being obtained by soap-free emulsion polymerization, may be obtained by appropriately diluting the emulsion obtained by soap-free emulsion polymerization, or may be obtained by dispersing polymer fine particles obtained as a powder in a medium.

[Structural Color Development Property]

The polymer fine particles have a structural color development property. The structural color development property means that, when particles having a uniform particle diameter are regularly arranged, they exhibit a structural color.

The structural color development is a phenomenon in which, due to a crystal structure of regularly arranged particles, optical and physical phenomena such as interference and scattering occur depending on the wavelength of light and the particles appear to develop color.

The structural color development property depends on the properties of light, and thus is similarly exhibited not only in the visible light region but also in an ultraviolet region and an infrared region.

In order to exhibit the structural color development property in the ultraviolet region, polymer fine particles having a small number average particle diameter only need be used, and, in order to exhibit the structural color development property in the infrared region, polymer fine particles having a large number average particle diameter only need be used.

In the present disclosure, the polymer fine particles preferably have the structural color development property in the visible light region because the structural color development property is utilized for improving the design of an article.

Here, the visible light region represents a wavelength of 360 to 830 nm, the ultraviolet region represents a wavelength of 200 to 359 nm, and the infrared region represents a wavelength of 831 to 2500 nm.

[Structure and Method for Producing the Same]

The structure is an object in which the polymer fine particles are periodically arranged and are in a state of exhibiting a structural color, that is, developing color.

Here, the term "arranged" means that the polymer fine particles form colloidal crystals or form colloidal amorphous crystals. Colloidal amorphous crystals mean colloidal amorphous arrays.

The object exhibiting the structural color refers to an object that exhibits an angle-dependent color viewed differently depending on the viewing angle. The angle-dependent color is exhibited by occurrence of light diffraction/interference due to regular arrangement of polymer fine particles having a uniform particle diameter.

A method for producing the structure is, for example, as follows.

An emulsion of polymer fine particles obtained by soap-free emulsion polymerization is appropriately diluted, and a dispersion of carbon black is added thereto. This is referred to as "mixed sample".

After carbon black is well dispersed, the mixed sample is applied onto a smooth substrate. Next, the mixed sample is dried at an appropriate temperature to obtain a target object.

Since the polymer fine particles have a uniform particle diameter, when periodically arranged, the polymer fine particles are colloidally crystallized to exhibit a structural color.

[Article and Method for Producing the Same]

The article is an object in which the structure is formed on a substrate.

The substrate is not particularly limited, and general materials such as metal, resin, wood, and paper can be used.

The above mixed sample is applied onto the substrate, whereby an article exhibiting a structural color can be obtained. For the purpose of surface protection, a surface protective layer may be provided on a surface of the article exhibiting the structural color as necessary.

[Film]

The film is the article formed into a film shape.

In order to form the article into a film shape, a film-shaped material only need be used as the substrate. For the purpose of surface protection, a surface protective layer may be provided on a surface of the film as necessary.

EXAMPLES

Hereinafter, the present invention will be described in more detail with reference to Examples, but the present invention is not limited to the following Examples as long as it does not exceed the gist thereof.

In the following description, "part" and "%" represent "part by mass" and "mass %", respectively.

In the following Examples and Comparative Examples, various physical properties were measured by the following methods.

[Evaluation Method]

(1) Number Average Particle Diameter

An emulsion of polymer fine particles is applied onto a substrate, and dried, and then an image of the polymer fine particles is observed with an electron microscope at a magnification of 20,000 times or more. Diameters of at least 400 particles in the image were measured and arithmetically averaged to determine the number average particle diameter.

(2) CV Value of Particle Diameter

Using the measured values of the diameters of the at least 400 particles, (standard deviation/average particle diameter)×100 was calculated to determine the CV value of particle diameter on a number basis.

(3) Volume Average Particle Diameter

In the present disclosure, the volume median diameter is used as the volume average particle diameter.

The volume median diameter ($Dv_{50}$) of the polymer fine particles was measured using Nanotrac Wavell manufactured by MicrotracBEL Corporation and Date Management System for Microtrac analysis software manufactured by MicrotracBEL Corporation.

Specifically, 0.02 g of the emulsion was blended with 20 ml (concentration: 0.02%) of a sodium dodecylbenzenesulfonate diluent to prepare a sample dispersion, the sample dispersion was introduced into a sample cell, and measurement was performed under the following conditions: solvent refractive index: 1.333, measurement time: 180 seconds, and number of measurements: 1.

Other setting conditions were particle refractive index: 1.59, permeability: permeable, shape: spherical, and density: 1.00.

(4) Acid Value

The acid value is a number of mg of potassium hydroxide required to neutralize an acid component contained in 1 g of a resin. The acid value was determined according to the method of JIS K0070 except that the solvent was THF.

(5) Solid Content Concentration

The solid content concentration of the emulsion was determined by heating 10 g of the emulsion at 190° C. for 60 minutes to evaporate moisture using a heating and drying type moisture meter MX-50 manufactured by A & D Company, Limited.

(6) Yield

The yield was determined as follows.

The emulsion after the polymerization reaction was filtered through a double layer of nonwoven fabric gauze (Product Name: Treat) (F Three Corporation), and a total weight thereof was measured ((A) g).

Thereafter, the solid content concentration was measured ((B) %) by the method described in (5).

A solid content weight after the polymerization reaction was converted from the weight and solid content concentration of the obtained emulsion after the polymerization reaction. The solid content weight was divided by a theoretical solid content weight ((C) g) to obtain the yield.

Briefly, the yield was calculated as Yield=(A×B/100)/C [%].

(7) Structural Color Development Property

Predetermined structural color development according to the Bragg's equation was visually confirmed.

(7-1) Wavelength and Color Assumed from the Bragg's Equation

The Bragg's equation is given as the following equation:

$$\lambda_{max} = (8/3)^{1/2} \cdot D \cdot (n_{ave}^2 - \sin^2\theta)^{1/2}$$

where:

D: diameter of colloidal particles;

$$n_{ave} = n_1\varphi_1 + n_2\varphi_2;$$

n: refractive index;
φ: volume fraction;
Subscript 1: colloidal particles; and
Subscript 2: air gap (Air).
Specifically, $$n_1 = 1.592 \ldots \varphi_1 = 0.74$$

$$n_2 = 1.0 \ldots \varphi_2 = 0.26$$

were used.

Here, as the diameter of the colloidal particles, the number average particle diameter of the polymer fine particles was used.

The color development was determined by comparing the wavelength obtained from the Bragg's equation with the wavelength of visible light.

(7-2) Presence or Absence of Structural Color Development

It was visually confirmed whether the color assumed from the Bragg's equation was developed.

[Raw Material and the Like]

- Styrene (manufactured by Denka Company Limited)
- Acrylic acid (manufactured by Mitsubishi Chemical Corporation)
- Sodium styrenesulfonate (manufactured by Tosoh Finechem Corporation)
- Sodium hydrogen carbonate (manufactured by FUJIFILM Wako Pure Chemical Corporation)
- Ammonium persulfate (manufactured by KANTO CHEMICAL CO., INC.)
- Carbon black (manufactured by Mitsubishi Chemical Corporation)

Example 1

Styrene (98.4 parts) and acrylic acid (1.5 parts) were mixed to prepare a mixed monomer liquid.

On the other hand, an aid solution [A] was prepared by dissolving 0.1 parts of sodium styrenesulfonate and 0.15 parts of sodium hydrogen carbonate in 16.4 parts of ion-exchanged water.

Into a reaction vessel equipped with a stirrer, a heating and cooling apparatus, a nitrogen introduction apparatus, and a raw material/aid charging apparatus, 177.5 parts of ion-exchanged water was charged, and then the aid solution [A] was charged while the vessel was rotated at 150 rpm, and an internal temperature of the vessel was raised to 80° C.

Next, an initiator solution obtained by dissolving 0.42 parts of ammonium persulfate in 33.7 parts of ion-exchanged water was introduced into the reaction vessel, and, after 5 minutes, the mixed monomer liquid was sequentially added dropwise over 3 hours.

After completion of the dropwise addition of the mixed monomer liquid, polymerization treatment was performed over 5 hours. During the polymerization reaction after completion of the dropwise addition of the mixed monomer liquid, ion-exchanged water was appropriately added so that the liquid surface height did not change.

Thereafter, the polymerization reaction product was filtered through nonwoven fabric gauze (Product Name: Treat) to obtain an emulsion of polymer fine particles.

The obtained polymer fine particles had a number average particle diameter of 238 nm, a CV value of 3.8%, an acid value of 14.1 mg KOH/g, a solid content concentration of 29.1%, and a yield of 95%.

In addition, since one type of mixed monomer liquid was used, the polymer fine particles had a uniform resin composition, and Tg was calculated to be 100° C. from the Fox's equation.

This emulsion was diluted with ion-exchanged water so as to attain a solid content concentration of 10%, and a carbon black dispersion having a concentration of 20% was added so that the amount of carbon black was 0.5 parts with respect to 100 parts of the solid content of the emulsion to prepare a mixed sample. The mixed sample was well dispersed, then applied onto a smooth substrate using a dropper, and dried together with the substrate at 55° C. to obtain a structure.

Example 2

Styrene (98.43 parts) and acrylic acid (1.5 parts) were mixed to prepare a mixed monomer liquid.

On the other hand, an aid solution [B] was prepared by dissolving 0.07 parts of sodium styrenesulfonate and 0.15 parts of sodium hydrogen carbonate in 16.4 parts of ion-exchanged water.

Into a reaction vessel equipped with a stirrer, a heating and cooling apparatus, a nitrogen introduction apparatus, and a raw material/aid charging apparatus, 177.5 parts of ion-exchanged water was charged, and then the aid solution [B] was charged while the vessel was rotated at 150 rpm, and an internal temperature of the vessel was raised to 80° C.

Thereafter, an emulsion of polymer fine particles was obtained in the same manner as in Example 1.

Similarly as in Example 1, during the polymerization reaction after completion of the dropwise addition of the mixed monomer liquid, ion-exchanged water was appropriately added so that the liquid surface height did not change, but the amount thereof added was slightly larger. Therefore, the solid content concentration was a slightly lower value.

The obtained polymer fine particles had an acid value of 13.0 mg KOH/g, a solid content concentration of 27.7%, and a yield of 95%.

The number average particle diameter was not measured in Example 2, but was calculated, as number average particle diameter=volume average particle diameter 0.9775, to be 308 nm.

In Example 2, the CV value of particle diameter was not measured, but was calculated, as CV value determined in measurement of volume average particle diameter 0.1131, to be 2.7%.

In addition, since one type of mixed monomer liquid was used, the polymer fine particles had a uniform resin composition, and Tg was calculated to be 100° C. from the Fox's equation.

Using the obtained emulsion, a structure was obtained in the same manner as in Example 1.

Comparative Example 1

Styrene (99.9 parts) was prepared as a monomer.

On the other hand, an aid solution [C] was prepared by dissolving 0.1 parts of sodium styrenesulfonate and 0.16 parts of sodium hydrogen carbonate in 16.6 parts of ion-exchanged water.

Into a reaction vessel equipped with a stirrer, a heating and cooling apparatus, a nitrogen introduction apparatus, and a raw material/aid charging apparatus, 181.6 parts of ion-exchanged water was charged, and then the aid solution [C] was charged while the vessel was rotated at 150 rpm, and an internal temperature of the vessel was raised to 80° C.

Next, an initiator solution obtained by dissolving 0.42 parts of ammonium persulfate in 34.2 parts of ion-exchanged water was introduced into the reaction vessel, and, after 5 minutes, the monomer was sequentially added dropwise over 3 hours.

After completion of the dropwise addition of the monomer, polymerization treatment was performed over 5 hours. During the polymerization reaction after completion of the dropwise addition of the monomer, ion-exchanged water was appropriately added so that the liquid surface height did not change.

Thereafter, the polymerization reaction product was filtered through nonwoven fabric gauze to obtain an emulsion of polymer fine particles.

The obtained polymer fine particles had a number average particle diameter of 273 nm, a CV value of 1.8%, an acid value of 3.2 mg KOH/g, a solid content concentration of 30.4%, and a yield of 86%.

In addition, since one type of monomer was used, the polymer fine particles had a uniform resin composition, and Tg was calculated to be 100° C. from the Fox's equation.

Using the obtained emulsion, a structure was obtained in the same manner as in Example 1.

[Table 1]

TABLE 1

| | | Unit | Example 1 | Example 2 | Comparative Example 1 |
|---|---|---|---|---|---|
| Styrene | | [part] | 98.4 | 98.43 | 99.9 |
| Acrylic Acid | | [part] | 1.5 | 1.5 | — |
| Number Average Particle Diameter | | [nm] | 238 | 308 (Calculated Value) | 273 |
| CV Value | | [%] | 3.8 | 2.7 (Calculated Value) | 1.8 |
| Volume Average Particle Diameter | | [nm] | 242 | 315 | 281 |
| CV Value of Volume Average Particle Diameter | | [%] | 24.752 | 23.746 | 24.733 |
| Acid Value | | [mgKOH/g] | 14.1 | 13.0 | 3.2 |
| Presence or Absence of Structural Color Development | | — | Presence | Presence | Presence |
| Wavelength Assumed from Bragg's equation | 0 Degrees | [nm] | 559 | — | 641 |
| | 45 Degrees | | 451 | — | 516 |
| Visually Confirmed Color | 0 Degrees | — | Yellow-Green | Red | Red |
| | 45 Degrees | | Blue | Green | Green |
| Particle Structure | | — | Uniform | Uniform | Uniform |
| Tg | | [° C.] | 100 | 100 | 100 |
| Solid Content | | [%] | 29.1 | 27.7 | 30.4 |
| Yield | | [%] | 95 | 95 | 86 |

As shown in Table 1, in Example 1, the wavelength from the angle of 0 degrees calculated from the Bragg's equation was 559 nm, whereas yellowish green color was visually confirmed, and thus it could be confirmed that the product of Example 1 had the assumed structural color development. In addition, the wavelength from the angle of 45 degrees was 451 nm, whereas blue color was visually confirmed, and thus it could be confirmed that the product had the assumed structural color development.

In Example 2, the color development visually confirmed from the angle of 0 degrees was red color. The color development visually confirmed from the angle of 45 degrees was green color.

In Comparative Example 1, the wavelength from the angle of 0 degrees was 641 nm, whereas red color was visually confirmed, and thus it could be confirmed that the product of Comparative Example 1 had the assumed structural color development. In addition, the wavelength from the angle of 45 degrees was 516 nm, whereas green color was visually confirmed, and thus it could be confirmed that the product had the assumed structural color development.

From this, it could be confirmed that Examples 1 and 2 had structural color development similarly to Comparative Example 1 in which the acidic monomer acrylic acid was not used.

In addition, it could be confirmed that the structural color development property was not affected in both the region having a smaller particle diameter (Example 1) and the region having a larger particle diameter (Example 2) than that of Comparative Example 1. From this, it could be confirmed that the structural color development property does not depend on the particle diameter.

The polymer fine particles of Example 1, even when polymerized at a high solid content concentration of about 29%, generated small amounts of cullet at the time of polymerization and deposits onto an inner wall and the like of a polymerization apparatus, and were produced in a high yield of 95%.

The polymer fine particles of Example 2, even when polymerized at a high solid content concentration of about 28%, generated small amounts of cullet at the time of polymerization and deposits onto an inner wall and the like of the polymerization apparatus, and were produced in a high yield of 95%.

The polymer fine particles of Comparative Example 1 were inferior to those of Examples 1 and 2 in that the yield was reduced to 86% because cullet at the time of polymerization and deposits onto the inner wall and the like of the polymerization apparatus were generated in large amounts.

In addition, it could be confirmed that the Examples using the acidic monomer acrylic acid were good in yield in both the region having a smaller particle diameter (Example 1) and the region having a larger particle diameter (Example 2) than that of Comparative Example 1. From this, it could be confirmed that the yield does not depend on the particle diameter.

The invention claimed is:

1. Polymer fine particles having a number average particle diameter of 50 to 450 nm and a CV value of particle diameter on a number basis of 5% or less, wherein the polymer fine particles are composed of a polystyrene-based polymer which contains 90.0 mass % or more of styrene repeating units, based on a total mass of the polystyrene-based polymer and which contains a monomer unit derived from a metal salt of styrene-sulfonic acid, the polymer fine particles have an acid value of 5 to 14.1 mg KOH/g, and a Tg of the polymer fine particles is 60° C. or higher.

2. The polymer fine particles according to claim 1, wherein the polymer fine particles have a uniform resin composition.

3. The polymer fine particles according to claim 1, wherein the polystyrene-based polymer contains an acrylic acid unit and/or a methacrylic acid unit.

4. An emulsion in which the polymer fine particles according to claim 1 are dispersed in a medium mainly containing water.

5. A structure in which the polymer fine particles according to claim 1 are arranged and develop color.

6. An article in which the structure according to claim 5 is formed on a substrate.

7. The article according to claim 6, which is in the form of a film.

8. Polymer fine particles having a structural color development property when arranged, wherein the polymer fine particles are formed of a polystyrene-based polymer which contains 90.0 mass % or more of styrene repeating units, based on a total mass of the polystyrene-based polymer and which contains a monomer unit derived from a metal salt of styrene-sulfonic acid, the polymer fine particles have an acid value of 5 to 14.1 mg KOH/g, and a Tg of the polymer fine particles is 60° C. or higher.

9. The polymer fine particles according to claim 8, wherein the polymer fine particles have a uniform resin composition.

10. The polymer fine particles according to claim 8, wherein the polystyrene-based polymer contains an acrylic acid unit and/or a methacrylic acid unit.

11. An emulsion in which the polymer fine particles according to claim 8 are dispersed in a medium mainly containing water.

12. A structure in which the polymer fine particles according to claim 8 are arranged and develop color.

13. An article in which the structure according to claim 12 is formed on a substrate.

14. The article according to claim 13, which is in the form of a film.

15. The polymer fine particles according to claim 1, having a CV value of particle diameter on a number basis of 3.8% or less.

* * * * *